May 5, 1925.
J. A. HARWOOD
1,536,492
AUTOMATICALLY ADJUSTING BEET TOPPER
Filed May 16, 1924    2 Sheets-Sheet 2
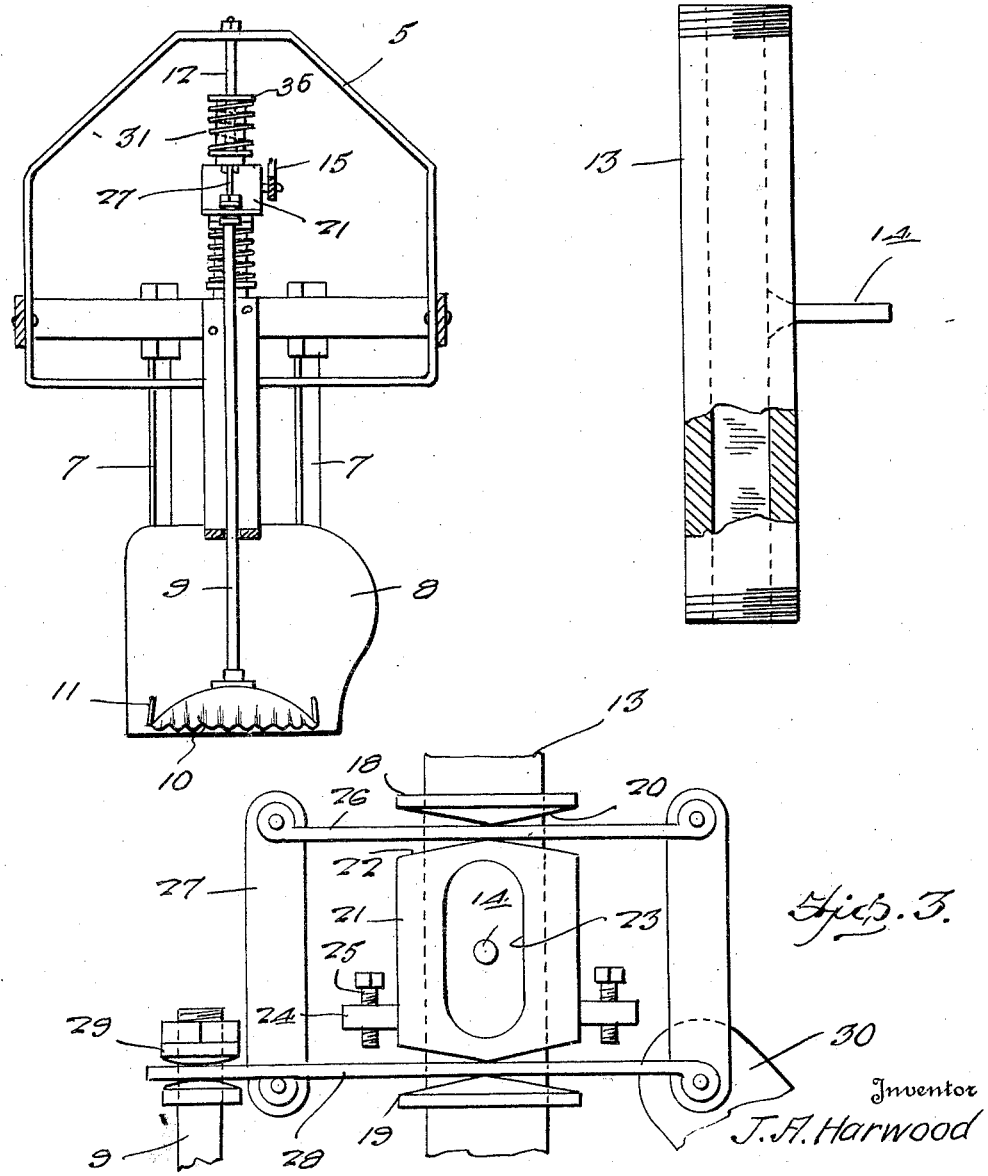

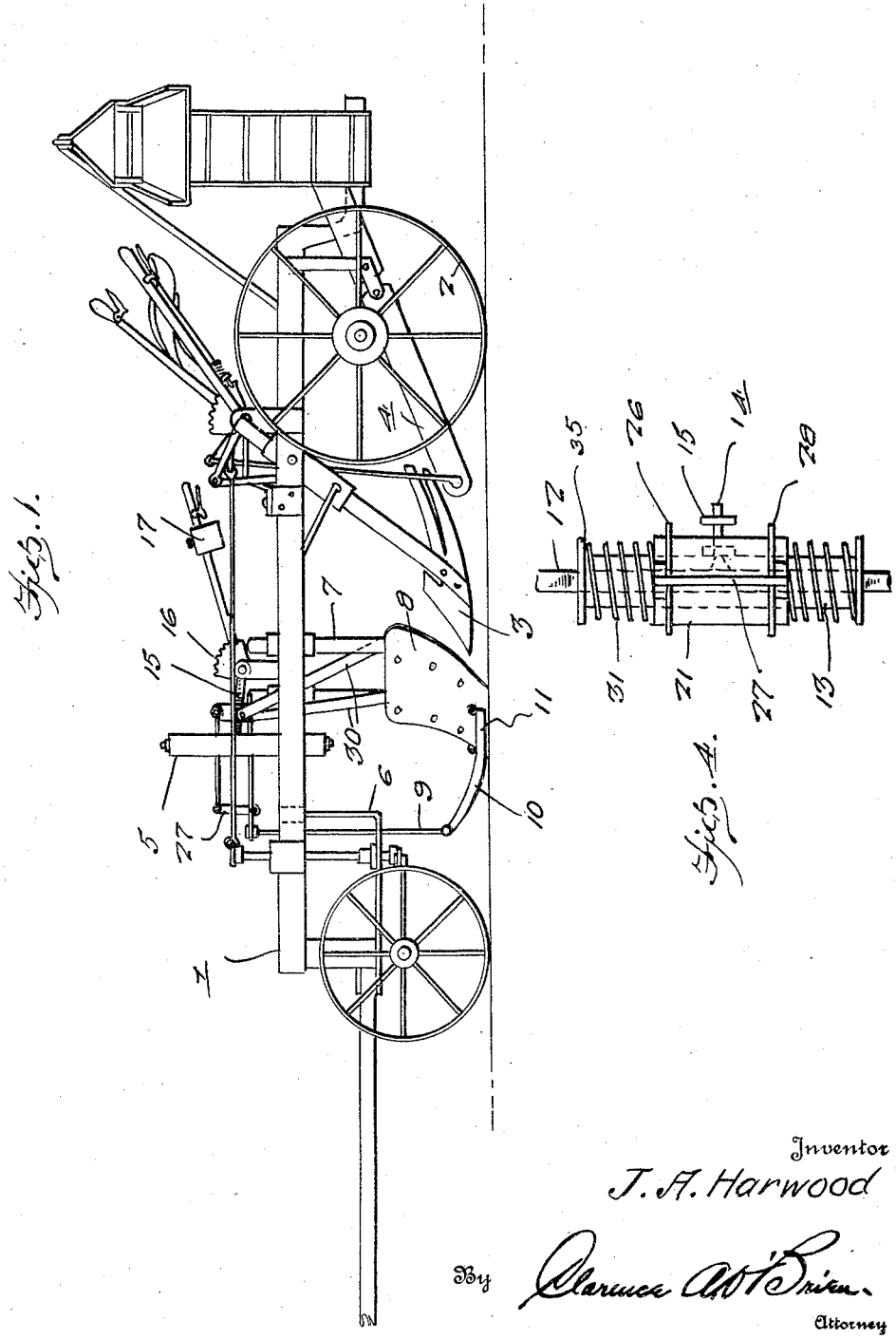

Patented May 5, 1925.

1,536,492

UNITED STATES PATENT OFFICE.

JAMES A. HARWOOD, OF WHEATLAND, WYOMING.

AUTOMATICALLY-ADJUSTING BEET TOPPER.

Application filed May 16, 1924. Serial No. 713,766.

*To all whom it may concern:*

Be it known that I, JAMES A. HARWOOD, a citizen of the United States, residing at Wheatland, in the county of Platte and State of Wyoming, have invented certain new and useful Improvements in an Automatically-Adjusting Beet Topper, of which the following is a specification.

This invention relates to an automatically adjusting beet topper machine and it consists in the novel features hereinafter described and claimed.

An object of the invention is to provide in combination with a beet harvester means for effectually removing the tops from the beets while they are standing in the soil, the said means being automatically adjustable whereby the tops of the beets are cut at uniform depth irrespective of irregularity in the alignment of the beets longitudinally of the row or vertically in the hills or ridges.

With this object in view, the structure includes a slide plate movably mounted upon the frame of the harvester and operatively connected with the top cutting blade thereof so that the said parts move vertically substantially at the same time. The slide plate is adapted to encounter the foliage and tops of the beets and consequently it will be raised or lowered as it passes over the beets and the blade will be correspondingly moved. A lever mechanism is provided upon the frame and may be used for adjusting the beet topping mechanism vertically.

In the accompanying drawings:—

Figure 1 is a side elevation of a beet harvester with the topping mechanism applied.

Figure 2 is a transverse sectional view of the forward portion of the harvester showing the topping mechanism in front elevation.

Figure 3 is an enlarged side elevation of the upper portion of the beet topping mechanism.

Figure 4 is an enlarged front elevation of an upper portion of the beet topping mechanism.

Figure 5 is a side elevation, partly in section, of a tubular sleeve used in the beet topping mechanism.

As illustrated in the accompanying drawings, the beet harvester to which the beet topping mechanism is applied comprises a frame 1 mounted at its rear portion upon ground engaging wheels 2. Beet lifters 3 are carried by the frame and an elevator and conveyor 4 of conventional form is carried by the frame and located behind the beet lifting point 3. Suitable lever mechanisms may be provided for raising and lowering the beet lifters and the forward end of the elevator and conveyor in a usual manner.

The beet topping mechanism comprises a yoke 5 which is mounted upon the frame 1. A bracket member 6 depends from the forward portion of the frame 1. Standards 7 are mounted for vertical sliding movement upon the frame 1 and carry at their lower ends a forwardly and downwardly curved topping blade 8. A rod 9 is mounted for vertical sliding movement in the bracket 6 and carries at its lower end a rearwardly and downwardly curved plate 10, which is corrugated longitudinally as best indicated in Figure 2 of the drawings. The plate 10 is provided at its side edges with upturned flanges 11. The plate 10 is located in advance of the blade 8. A vertically disposed shaft 12 is carried by the yoke 5 and said shaft is square in transverse section. A tubular sleeve 13 is slidably mounted upon the shaft 12 and carries at its side an outstanding stud 14 which is pivotally connected with one end of a lever 15 which is fulcrumed upon the frame 1 of the harvester. Suitable securing means, as for instance, a gear segment 16 may be provided for holding the lever 15 at an adjusted position and the said lever carries a movable dog adapted to engage the teeth of the segment whereby the said lever is held at the adjusted position and in a conventional manner. A counter-balance weight 17 is adjustably mounted upon the lever 15. Rings 18 and 19 are mounted upon the sleeve 13 and have convexed inner surfaces 20. A collar 21 is mounted upon the sleeve 13 between the rings 18 and 19 and is provided with convexed ends 22, the said collar is also provided with a slot 23 through which the stud 14 passes. The collar 21 is further provided at its opposite sides with outstanding lugs 24 through which set screws 25 are threaded. Plate 26 is mounted upon the sleeve 13 and is located between the convexities 20 and 22 of the ring 18 and the collar 21. Links 27 are pivotally connected with the ends of the plate 26 and the lower ends of the links 27 are pivotally connected with a plate 28 which is mounted upon the sleeve 13 and located between the convexities of the lower ring and the lower end of the collar 21. The plate 28 is provided at its forward end with an extension through which the upper end of the rod 9 passes. Nuts 29 are screwed upon the upper end of the rod 9 and disposed at the opposite side of the extension of the plate 28. The inner faces of the nuts 29 are convexed as best shown in Figure 3. Links 30 are pivotally connected at their upper ends with the lower ends of the rear links 27 and the rear end of the plate 28, and at their lower ends with the standards 7 and the blade 8. Springs 31 surround the sleeve 13 and bear at their inner ends against the rings 18 and 19 and at their outer ends against flanges 35 of sleeve 13 and serve to resiliently hold the collar 21 at a proper position upon the sleeve 13 with the ends of the slot 23 spaced from the stud 14.

Therefore it will be seen by swinging the lever 15, the blade 8 and the plate 10 are moved vertically and simultaneously and may be secured at a vertically adjusted position. As the harvester moves along a row of beets which are standing in the soil, the plate 10 rides over the tops of the beets and is moved vertically, depending upon the height of the beets in the soil. As the said plate is moved vertically, the blade 8 is also moved vertically and consequently when the plate passes over the top of the beets, the cutting edge of the blade encounters the sides of the beets and severs the tops therefrom. Thus it will be seen that all of the tops which are removed from the beets will be substantially of the same vertical thickness irrespective of the height of the upper portions of the beets with relation to the surface line of the soil. The set screws 25 may be adjusted so as to encounter the plate 28 whereby the rod 9 and the plate 10 may be held at a proper or desired angle with relation to the surface of the soil and the beets standing therein.

Having thus described the invention, what I claim is:—

1. A beet topping mechanism comprising a yoke, a vertically disposed shaft carried by the yoke, a sleeve slidably mounted thereon, a lever mechanism operatively connected with the sleeve, for sliding the same upon the shaft, plates disposed transversely of the sleeve, a collar located between the plates, spring means for holding the collar at the intermediate portion of the sleeve, set screws on the collar adapted to engage one of the plates, links pivotally connecting the plates together, a blade connected with the rear end of the lower plate, a rod connected with the forward end of the lower plate, and a beet top engaging plate carried at the lower end of the rod and disposed in advance of the blade.

2. A beet topping mechanism comprising a yoke, a vertically disposed shaft carried by the yoke, a sleeve mounted on the shaft, a stud extending from the sleeve, lever mechanism operatively connected with the stud, the ends of said sleeve provided with flanges, plates disposed transversely of the sleeve, a collar located on the sleeve between the plates, rings on the sleeve one at each end of the collar, said plates being disposed between the ends of the collar and the rings, springs disposed about the sleeve, one between each flange thereof and the adjacent ring for holding the collar at the intermediate portion of the sleeve, and links pivotally connecting the plates together, a blade connected with the rear end of the lower plate, a rod connected with the forward end of the lower plate, and a beet top engaging plate carried at the lower end of the rod and disposed in advance of the blade.

3. A beet topping mechanism comprising a yoke, a vertically disposed shaft carried by the yoke, a sleeve mounted on the shaft, a stud extending from the sleeve, lever mechanism operatively connected with the stud, the ends of said sleeve provided with flanges, plates disposed transversely of the sleeve, a collar located on the sleeve between the plates, rings on the sleeve one at each end of the collar, said plates being disposed between the ends of the collar and the rings, springs disposed about the sleeve, one between each flange thereof and the adjacent ring for holding the collar at the intermediate portion of the sleeve, links pivotally connecting the plates together, a blade connected with the rear end of the lower plate, a rod connected with the forward end of the lower plate, a beet top engaging plate carried at the lower end of the rod and disposed in advance of the blade, the adjacent faces of the edges of the collar and the rings being convex.

In testimony whereof I affix my signature

JAMES A. HARWOOD.